Sept. 11, 1945.   B. W. KEESE ET AL   2,384,471
VEHICLE
Filed Feb. 26, 1942   3 Sheets-Sheet 1
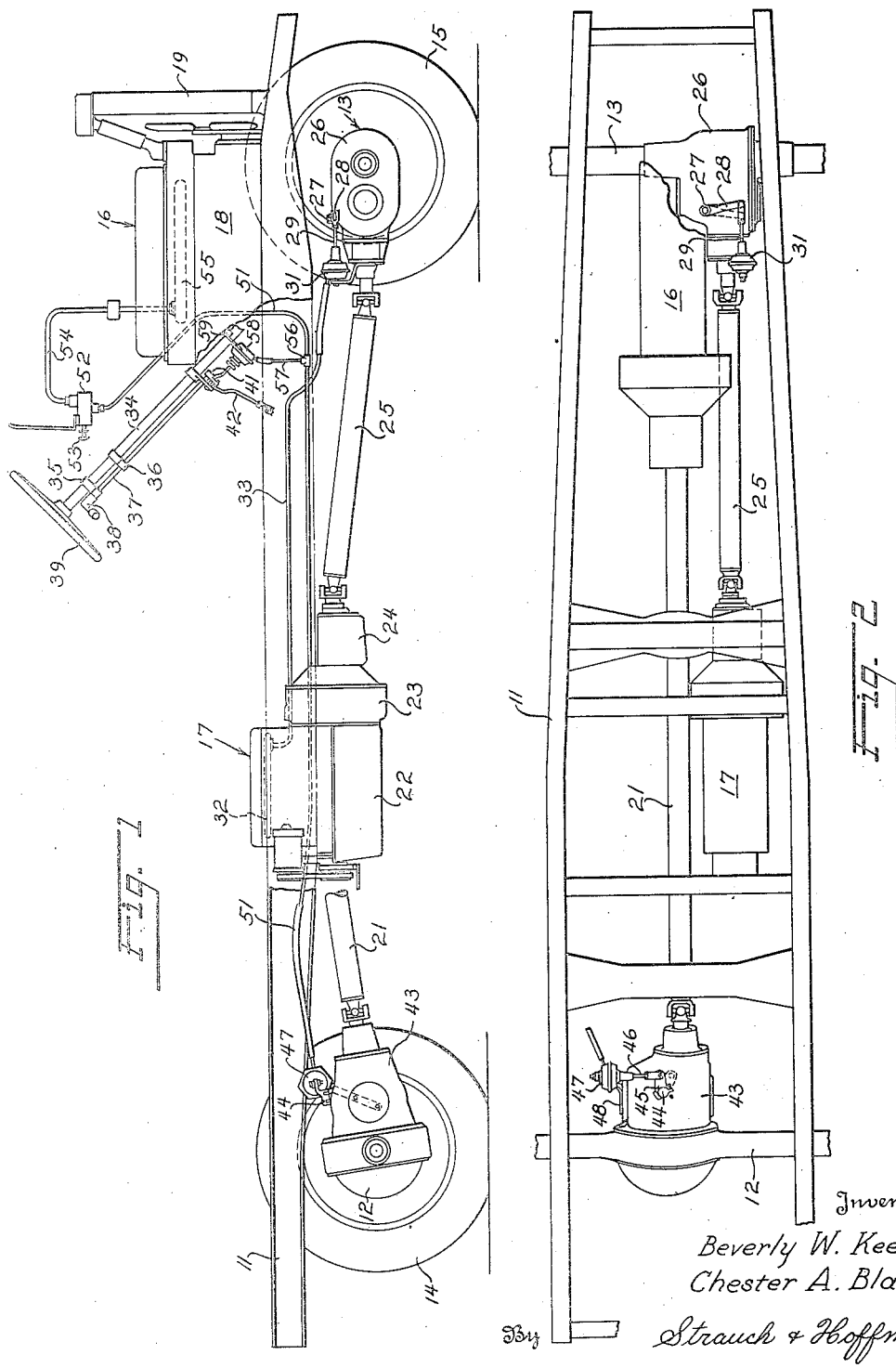
Inventors
Beverly W. Keese
Chester A. Blair
By Strauch & Hoffman
Attorneys

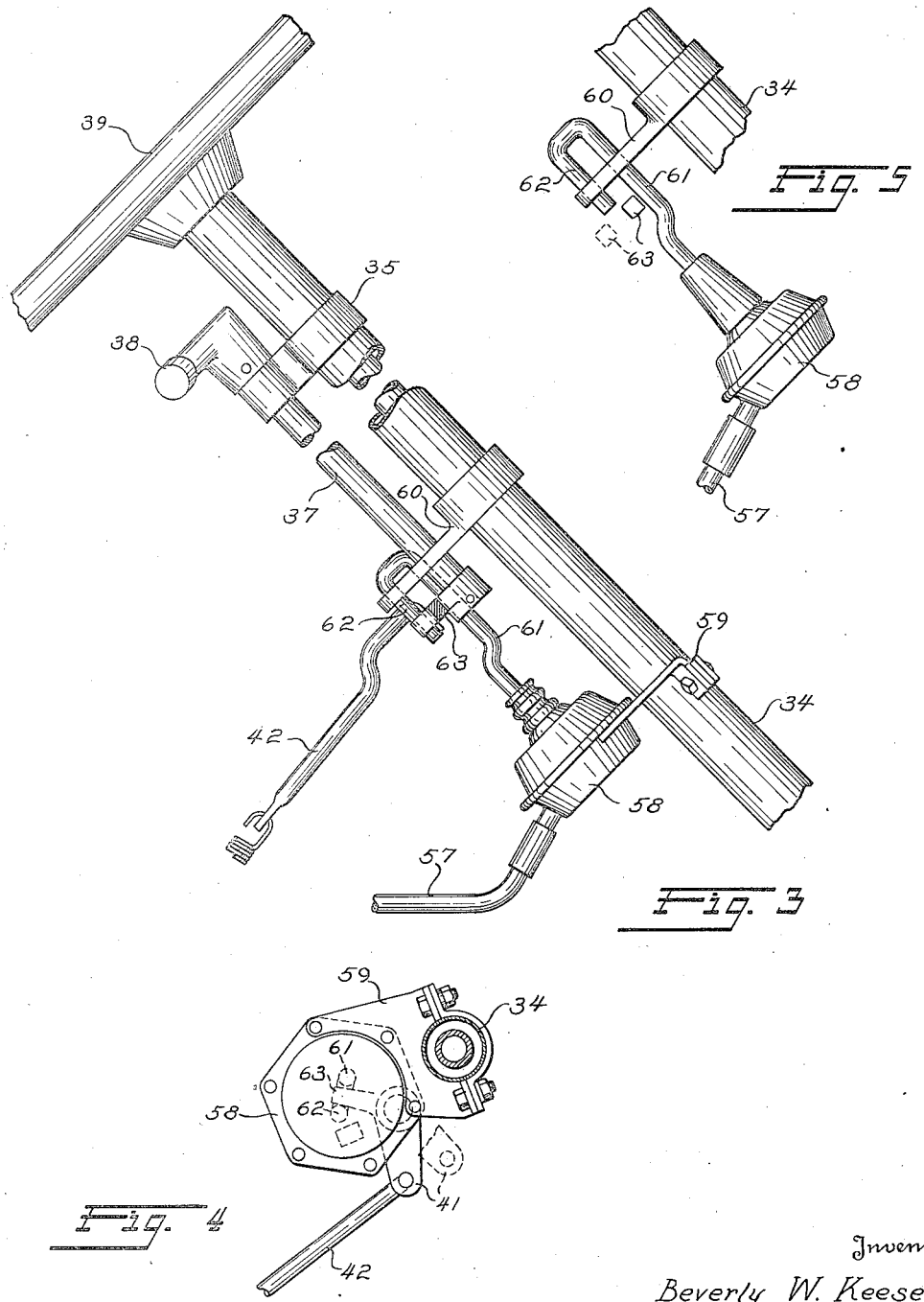

Sept. 11, 1945.    B. W. KEESE ET AL    2,384,471
VEHICLE
Filed Feb. 26, 1942    3 Sheets-Sheet 3
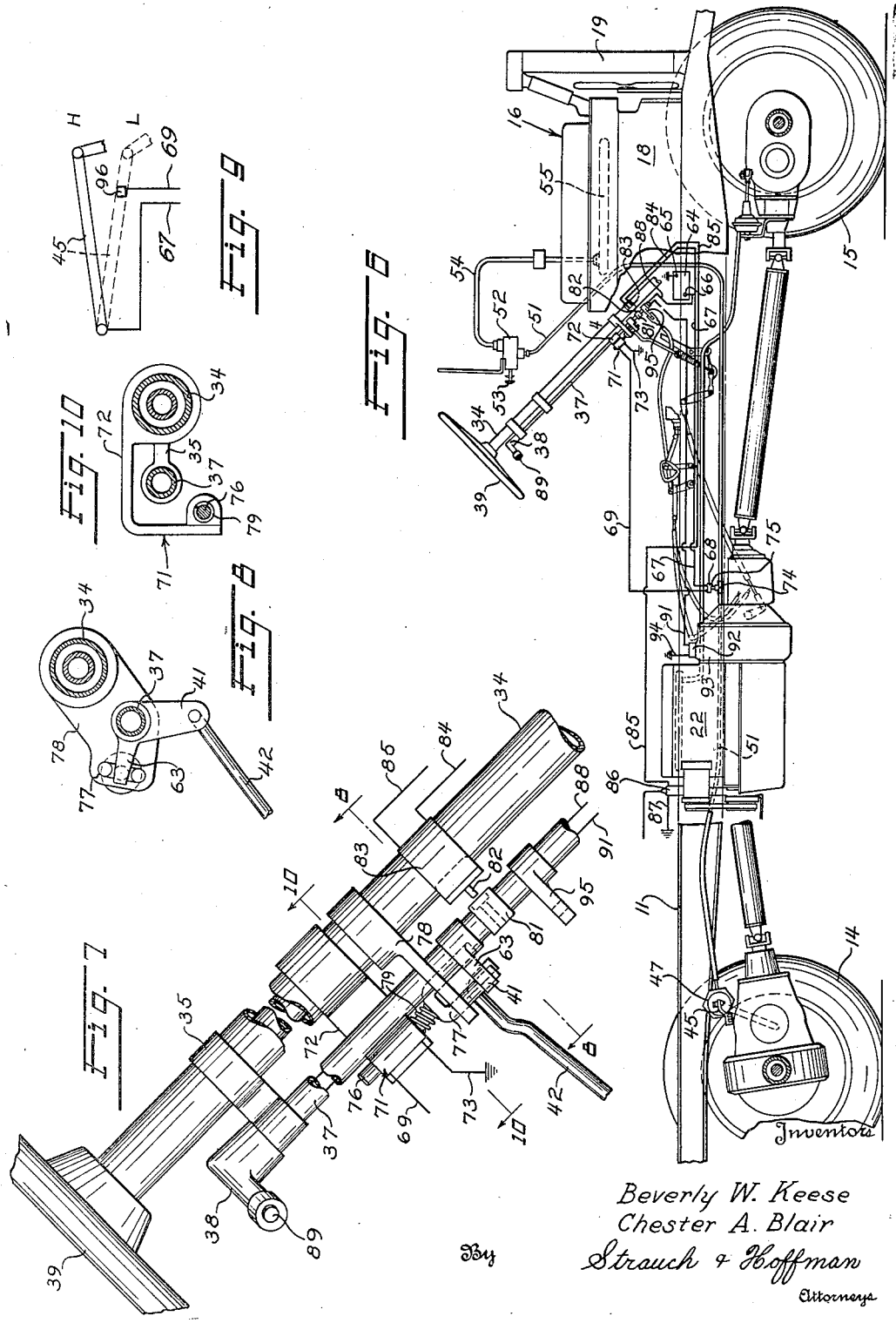
Inventors
Beverly W. Keese
Chester A. Blair
By Strauch & Hoffman
Attorneys Patented Sept. 11, 1945

2,384,471

UNITED STATES PATENT OFFICE 2,384,471

VEHICLE

Beverly W. Keese and Chester A. Blair, Oshkosh, Wis., assignors to The Timken-Detroit Axle Company, Detroit, Mich., a corporation of Ohio Application February 26, 1942, Serial No. 432,520

7 Claims. (Cl. 180—54)

This invention relates to vehicles and is particularly concerned with selective drive and control arrangements for engine driven vehicles.

The broader aspects of the subject matter herein disclosed are claimed in applications Serial No. 527,782, filed March 23, 1944, by Walter F. Rockwell and Beverly W. Keese, for Automotive vehicle, and Serial No. 506,582, filed October 16, 1943, by Walter F. Rockwell and Beverly W. Keese, for Automotive vehicle.

It is the major object of the present invention to provide a vehicle having a multi-speed drive axle and a single speed drive axle cooperatively and selectively operable to propel the vehicle with maximum efficiency under various road conditions.

It is a further object of the invention to provide a dual engine vehicle having the individual engines connected to drive separate drive axles, wherein one of the axles is a multi-speed drive axle and the other is a single speed drive axle having a drive speed ratio corresponding with a lower drive speed ratio of the multi-speed drive axle.

It is a further object of the invention to provide a dual engine vehicle wherein separate drive axles are driven by the individual engines and the controls for one of the engines are selectively locked during certain conditions of operation of the vehicle by the other of said engines.

It is a further object of the invention to provide a vehicle having a main engine drive-connected to a multi-speed drive axle and an auxiliary engine drive connected to a single speed drive axle. Preferably the rear axle is a multi-speed drive axle.

It is a further object of the invention to provide a dual engine vehicle having a main engine drive-connected to a multi-speed axle and an auxiliary engine connected to drive a single speed declutching-type axle, and control mechanism for preventing drive of the single speed axle except when the multi-speed axle is driven at the same drive speed ratio. This mechanism is preferably pneumatically or electrically operated.

It is a further object of the invention to provide a dual engine vehicle, in which the engines are connected to separate drive axles and the controls for one of said engines and its associated axle are automatically held inoperative by a device responsive to operation of the other engine under certain conditions.

A further object of the invention is to provide a vehicle having main and auxiliary engines operable to drive the vehicle by the main engine alone or in cooperation with the auxiliary engine, wherein special pressure responsive or electrical devices are provided for selectively locking out and restoring operation of the auxiliary engine drive.

Further objects of the invention will presently appear as the description proceeds in connection with the appended claims and the annexed drawings in which:

Figure 1 is a diagrammatic side elevational view of a dual engine vehicle embodying the principles of the invention, illustrating especially the controls for a two-speed rear drive axle and a single speed declutching type front axle;

Figure 2 is a diagrammatic top plan view of the dual engine vehicle of Figure 1, illustrating further details of the controls;

Figure 3 is a fragmentary view illustrating pneumatic mechanism actuated by the intake vacuum of the main engine for automatically locking the auxiliary drive control rod, when the two-speed axle is in its high gear ratio. The mechanism is shown in locked condition;

Figure 4 is a fragmentary plan view looking upwardly from the bottom of Figure 3, illustrating further the pressure responsive device for locking the auxiliary drive control rod;

Figure 5 is a fragmentary view corresponding to the lower part of Figure 3, but illustrating the auxiliary drive control rod locking device in unlocked condition;

Figure 6 is a diagrammatic side elevation similar to Figure 1, but illustrating another embodiment of the invention wherein the auxiliary engine control rod is electrically locked;

Figure 7 is a fragmentary view illustrating the solenoid actuated lock device for the auxiliary engine control rod. The device is shown in the locked position it occupies when the rear axle is in its high gear ratio;

Figure 8 is a partly sectional view along line 8—8 in Figure 7 illustrating further the solenoid lock for the auxiliary engine control rod;

Figure 9 illustrates another form of solenoid switch actuated by the rear axle gear shift lever.

Figure 10 is a section on line 10—10 of Figure 7, illustrating the bracket for mounting the control rod lock magnet on the steering post.

Referring to Figures 1 and 2, the vehicle comprises the usual chassis 11 mounted on rear axle 12 and front axle 13. The opposite ends of axles 12 and 13 are supported by ground engaging wheels 14 and 15, respectively.

Chassis 11 supports two power plants 16 and 17, individually connected to the respective axles. Main power plant 16 is preferably the usual power plant in the standard automobile chassis, being located on the longitudinal center line of the chassis and comprising an engine 18 having a water cooling radiator 19 and the usual associated clutch and transmission mechanisms (not shown), and drive-connected to rear drive axle 12 by a central propeller shaft 21.

Auxiliary power plant 17, located to one side of the longitudinal center line of the vehicle close to one of the main longitudinal chassis rails, comprises engine 22 and associated clutch and transmission mechanisms 23 and 24, respectively, and is drive-connected by a propeller shaft 25 to front drive axle 13 which is of the declutching-type. Auxiliary power plant 17 is preferably of standard construction although of considerably smaller normal power output than power plant 16, the former being preferably about one-half as powerful as the latter. The invention is applicable however where both power plants are of equal power.

Axle 13 comprises an enlarged housing 26 containing declutching mechanism which is operated by projecting rock shaft 27 having a control lever 28 rigid therewith and pivotally connected to piston rod 29 extending from a vacuum cylinder 31 mounted on axle 13. The interior of vacuum cylinder 31 is in fluid communication with the intake manifold 32 of engine 22 by means of a conduit 33, and a spring (not shown) within cylinder 31 normally urges the clutch control lever 28 into the full line clutch-disengaged position of Figure 2.

Steering post 34 within the vehicle supports spaced bearings 35 and 36 on which an auxiliary drive control rod 37 is mounted for axial rocking movement. Rod 37 has a handle 38 disposed adjacent steering wheel 39 so as to be conveniently accessible to the hand of the driver. Rod 37 is provided at its lower end with a radially projecting rigid lever 41 pivotally connected to a clutch mechanism control link 42. Rod 37 is also connected to control transmission actuating mechanisms as disclosed in Figure 6.

The above described arrangements for driving front and rear axles from the respective power plants, for controlling the front axle clutch by the auxiliary engine manifold vacuum, and the control rod and associated mechanisms for placing the auxiliary engine in operation are the same as disclosed fully in copending application Serial No. 356,214, of Beverly W. Keese and Arthur J. Hazen and assigned to the assignee of this application to which application reference is made for further explanation and detail. The cooling fluid for both engines 16 and 22 is circulated through radiator 19 as disclosed in said copending application Serial No. 356,214. Front axle 13 may be any suitable single speed declutching-type steer drive axle, but is preferably the same as the front axle disclosed in U. S. Patent No. 2,309,432, issued January 26, 1943, to H. W. Alden for Motor vehicle.

The present invention distinguishes over said Serial No. 356,214 mainly in the provision of a multi-speed rear axle, and insuring that the auxiliary engine cannot be operated to drive the front axle when the main engine is driving the rear axle at a speed ratio which does not correspond to the speed ratio of the front axle.

The differential housing of rear axle 12 is rigidly secured to a casing 43 housing shiftable gear mechanism selectively actuated by the vertical control shaft 44 projecting upwardly from the casing. Shaft 44 is rockable about its axis and has rigid therewith a lever 45 which is pivotally connected to one end of the piston rod 46 projecting from a cylinder 47 carried by a bracket 48 rigid with the gear box housing. When lever 45 is in the full line position of Figure 2, the gear mechanism within the casing is in position to drive the rear axle at its high speed ratio. A suitable spring within cylinder 47 urges lever 45 clockwise, and when lever 45 is rocked to the dotted line position of Figure 2, the gear mechanism within the casing is selectively positioned to drive the rear axle at its slow speed ratio.

The rear axle assembly illustrated in the drawings is the two-speed rear axle assembly disclosed in United States Patent No. 2,183,667, issued December 19, 1939, to Lawrence R. Buckendale. Although I have chosen to illustrate the invention as embodying a two-speed rear axle, any multiple speed axle may be employed. It is essential only that the multiple speed axle have a speed ratio which is the same or approximately the same as that of the single speed front axle, preferably a low speed. In the illustrated embodiment, the lower speed ratio of axle 12 is the same as the single speed ratio available in axle 13. This means that when axle 12 is in its lower speed ratio wheels 14 are driven at the same peripheral speed as wheels 15 are adapted to be driven by the front axle drive.

Referring to Figure 1, the interior of cylinder 47 is connected by a conduit 51 to a valve assembly 52 mounted on the vehicle dash board in such location that valve control push button 53 is easily accessible to the hand of the operator sitting at the steering wheel. A conduit 54 connects valve 52 to the intake manifold 55 of the main engine 16, so that when valve 52 is open to permit fluid communication between conduits 51 and 54, the interior of cylinder 47 is in fluid communication with the intake manifold of engine 16 and speed ratio selecting operation of lever 45 is responsive to the intake vacuum of main engine 16.

Valve assembly 52 is of such construction that, when button 53 is in the full line position of Figure 2, conduits 51 and 54 are in fluid communication, whereas when button 53 is in the dotted line position of Figure 2, communication between conduits 51 and 54 is closed and conduit 51 is vented to the atmosphere.

Adjacent the bottom of the steering post, conduit 51 is provided with a T-shaped connection 56 from which a branch conduit 57 leads to a cylinder 58 carried by a bracket 59 rigidly bolted to the steering post as shown in Figure 4. Piston rod 61 extends upwardly from cylinder 58 and is bent back at its upper end into a substantially hook-shaped formation having a return leg 62 parallel to rod 61. Rod 61 and leg 62 slidingly embrace opposite sides of a radial stop projection 63 rigid with the lower end of rod 37. Stop projection 63 is preferably disposed at an angle to lever 41. For practical purposes, lever 41 and projection 63 are preferably integral with a cylindrical boss which in turn is non-rotatably secured as by pins to the lower end of rod 37.

Figure 3 illustrates rod 37 locked against rotation since rod 61 and leg 62 act as stops preventing rocking movement of projection 63 in either direction. A spring (not shown) within cylinder 58 urges piston rod 61 upwardly toward the non-locking position of Figure 5, wherein the hook-shaped end of the piston rod is clear of projection 63, enabling rod 37 to be rocked about its axis. Piston rod 61 is guided and partially supported by a guide bracket 60 rigid with the steering post.

*Operation*

Under normal operating conditions, as when the vehicle is travelling over a level road and where the main engine provides sufficient power for propelling the vehicle, only the main power plant is maintained in operation and it drives the rear axle at its high speed gear ratio. During this normal operation, valve control button 53 is pulled out to the full line position of Figure 1 thereby opening valve 52 to permit the intake vacuum of running engine 18 to be communicated with the interior of cylinder 47. The suction in cylinder 47 causes inward displacement of the piston on rod 46 thereby rocking and maintaining lever 45 in the full line high speed ratio position shown in Figure 2.

During this normal operation of the vehicle, when engine 18 is driving rear axle 12 at its high speed ratio, control rod 37 is automatically locked against rotation by piston rod 61 as above described and as shown in Figure 3, for the purpose of preventing the auxiliary engine from being placed in operation to drive the front axle. Also during this period of normal operation, auxiliary engine 17 is idle with its intake manifold at atmospheric pressure and the spring within cylinder 31 maintains piston rod 29 displaced forwardly to maintain lever 28 in the full line clutch-disengaged position shown in Figure 2, so that the front steer drive axle operates as a dead steering axle under these conditions.

During this normal operation, the vehicle is controlled by the usual clutch manipulations and transmission gear shifting available in the main power plant, with the auxiliary power plant clutch and transmission controls maintained inoperative as disclosed in Serial No. 356,214 and shown in Figure 6.

When the vehicle encounters a grade or other heavy traction condition, the controls may be manipulated to change the rear axle drive ratio and, if desired, further to place the auxiliary power plant in operation and convert the front axle into a driving axle. The first step in accomplishing this conversion is to push valve control button 53 into the dotted line position shown in Figure 1, whereby conduit 51 is cut off from the intake vacuum of engine 18 and vented to the atmosphere. Upon subsequent momentary release of the accelerator pedal by the operator, the torque is momentarily interrupted, releasing the tooth pressure and permitting the spring within cylinder 47 to displace the piston and rod 46 outwardly to rock and maintain lever 45 in the dotted line position shown in Figure 2. This operation automatically changes the drive of axle 12 from its high speed ratio to its low speed ratio. At this point, the vehicle can be driven through its usual transmission range with the rear axle in its lower speed ratio.

This operation simultaneously unlocks rod 37 because upon relief of the suction within cylinder 58 the piston and rod 61 are spring urged upwardly to the non-locking position of Figure 5, releasing projection 63 from the embrace of piston rod 61.

Handle 38 can now be manipulated to rock control rod 37 counterclockwise (Figure 4) to place the auxiliary power plant in operation in the manner described in Serial No. 356,214, which is referred to for further detail.

When auxiliary engine 22 is started, its intake vacuum causes automatic displacement of lever 28 to the clutch-engaged dotted line position of Figure 2, so that the front axle becomes converted to a steer drive axle. Under these conditions the vehicle is adapted to be simultaneously driven by the front axle and the rear axle in its lower speed ratio.

Both controls 53 and 38 for placing the vehicle in condition for heavy traction operation are within the easy reach of the operator, and add little or no effort to his burden of operating the vehicle.

Electrical lock

Figure 6 illustrates a modified embodiment of the invention which is similar to that above-described except chiefly that a solenoid locking device controlled by a master switch responsive to the intake vacuum of main engine 18 is provided for auxiliary engine control rod 37.

The usual electrical storage battery 64 is supported on the vehicle chassis and grounded to the chassis by a wire from terminal 65. From the other battery terminal 66, a wire 67 leads to a master switch 68 carried by the chassis. Wire 69 connects master switch 68 with a solenoid 71 rigid with a bracket 72 secured to steering post 34 as shown in Figure 10. The solenoid is grounded to the chassis by a wire 73.

Master switch 68 is of the pneumatic type and preferably comprises a flexible diaphragm or movable piston operating a contact making and breaking device. The interior of switch 68 is in fluid communication with line 51 through T-fitting 74 and pipe 75. When a vacuum exists in line 51, as when engine 18 is running and button 53 is in the full line position of Figure 6, the diaphragm or piston is sucked to a position where it breaks electrical connection between wires 67 and 69. However, when line 51 is vented to the atmosphere, as when button 53 is pushed inwardly to automatically cause shifting of the rear axle to its slow speed drive ratio, a spring (not shown) within master switch 68 returns the diaphragm or piston to restore electrical connection between wires 67 and 69. This completes an electrical circuit through the battery, master switch and solenoid. Master switch 68 may be of any conventional construction for the purpose and further description thereof is unnecessary.

Referring to Figure 7, solenoid 71 is provided with a reciprocable armature 76 having a forked lower end 77 extending through suitable guide apertures in a bracket 78 rigid with steering post 34. Fork 77 is adapted to embrace opposite sides of stop projection 63 on rod 37. Figure 7 illustrates the armature in its locking position, into which it is normally urged by a coil spring 79 when solenoid 71 is de-energized.

When solenoid 71 is energized by closing of master switch 68 as above-described, the armature is jerked upwardly from the position shown in Figure 7 until fork 77 is clear of projection 63 and the operator can rock control rod 37 as desired.

In the vehicle shown in Figure 6, the sequence of operations is substantially the same as Figure 1. When button 53 is pushed into its dotted line position to disconnect line 51 from the intake vacuum of engine 18 and vent line 51 to atmosphere, and the operator momentarily releases throttle opening pressure on the accelerator pedal, piston 47 shifts the rear axle to its low speed ratio and master switch 68 simultaneously closes the solenoid circuit to cause unlocking of control rod 37. Subsequent operations are the same as described for Figure 1. The starter button 89 is pressed only after rod 37 has been rotated to close ignition switch 83.

Below lever 41, rod 37 has secured thereto a contour cam 81 adapted to engage the spring biased switch button 82 of the auxiliary engine ignition switch 83 carried by the steering post. A wire 84 connects switch 83 with battery terminal 66, and another wire 85 connects switch 83 to the high tension coil 86 of auxiliary engine 22. Coil 86 is grounded to the chassis by wire 87. Switch 83 is open when rod 37 is in the locked condition illustrated in Figures 6 and 7. Rotation of control rod 37 causes cam 81 to depress button 82 to close the circuit between wires 84 and 85, thereby completing the ignition circuit of auxiliary engine 22. This arrangement is also used on rod 37 in the embodiment of Figure 1.

A wire 88 extends from battery terminal 66 up through the interior of hollow rod 37 to a push-button switch 89 on handle 38. From switch 89 a second wire 91 extends down through the interior of rod 37 and to one terminal of a magnetic switch 92 on the starting motor 93 of auxiliary engine 22. Wire 94 grounds the other terminal of switch 92 to the frame to close the starting circuit of engine 22. Thus starting motor 93 may be operated at any time merely by closing switch 89, but since ignition switch 83 is open when control rod 37 is unlocked, engine 22 cannot be started except when the control rod is unlocked and rotated. This starting motor arrangement is preferably used in the vehicle of Figure 1.

Below cam 81, a lever 95 is rigidly secured to the lower end of rod 37 and pivotally connected to a Bowden wire control for the transmission actuating mechanism illustrated in Figure 6. This transmission mechanism and also the clutch mechanism controlled by member 42 illustrated in Figure 6 is the same as that disclosed in the above-mentioned U. S. application Serial No. 356,214 to which reference is made for further details of construction and operation.

In the vehicle of Figure 6, the master switch for solenoid 71 may be located at the rear axle and actuated by movement of lever 45 as shown in Figure 9. This can be accomplished by omitting master switch 68 and connecting wires 67 and 69 to an insulated metal lever 45 and an insulated spring metal contact 96 on gear box 43, respectively, so that lever 45 engages and maintains engagement with contact 96 only when pulled to its low speed ratio position. If desired, ignition switch 83 can be connected in electrical series with the solenoid switch so that even if button 82 was accidentally depressed, the ignition circuit of engine 22 would not be closed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a multi-speed axle having at least two drive gear ratios, a single speed axle having a drive gear ratio corresponding to one of said multi-speed axle gear ratios, individual engines connected to drive said axles, a control member governing drive of said single speed axle by its associated engine, locking means for said control member, and means for selecting the speed ratio of said multi-speed axle operative to release said locking means when said one multi-speed axle gear ratio is selected.

2. The combination defined in claim 1, wherein said control member is provided with means for closing the ignition circuit of the engine associated with said single speed axle and means for starting said engine.

3. In a vehicle, a multi-speed axle having at least two drive gear ratios, a single speed axle having a drive gear ratio corresponding to one of said multi-speed axle gear ratios, individual engines connected to drive said axles, a control member governing drive of said single speed axle by its associated engine, and pressure responsive locking means responsive to the operation of the engine connected to said multi-speed axle for locking said control member except when said multi-speed axle is driven through said one gear ratio.

4. In a vehicle, a multi-speed axle having at least two drive gear ratios, a single speed axle having a drive gear ratio corresponding to one of said multi-speed axle gear ratios, individual engines connected to drive said axles, a control member governing drive of said single speed axle by its associated engine, and electrically energized locking means responsive to the operation of the engine connected to said multi-speed axle for locking said control member except when said multi-speed axle is driven through said one gear ratio.

5. In a vehicle, a multi-speed axle having at least two drive gear ratios, a drive speed selector for said axle, a single speed drive axle having a drive gear ratio corresponding to one of said multi-speed axle gear ratios, individual engines connected to drive said axles, a control member governing operation of said single speed axle, locking means for said control member, and means actuated by the intake vacuum of the engine driving said multi-speed axle operative to shift said multi-speed axle gearing and release said locking means when said one gear ratio of said multi-speed axle is utilized.

6. In a vehicle, a two speed rear axle, a main engine connected to drive said axle, a drive ratio selecting member on said axle shiftable to select drive of said axle at either of said two speeds, a front axle, an auxiliary engine connected to drive said front axle, a clutch in said front axle, an operating lever for said clutch, a pressure responsive device connected to said clutch operating lever, a conduit connecting said pressure responsive means to the intake manifold of said auxiliary engine, a shiftable control member governing drive of said front axle by said auxiliary engine, locking means for said control member, pressure responsive means connected to actuate said drive ratio selecting member and said locking means, and a conduit connecting said pressure responsive means to the intake manifold of said main engine.

7. In a vehicle, a multi-speed drive axle; a drive ratio shifting member on said axle; a single speed drive axle; a main engine for normally driving said multi-speed drive axle; a normally inoperative auxiliary engine for driving said single speed drive axle; a control member for starting and stopping said auxiliary engine normally locked in non-starting position; means responsive to the operation of said main engine to maintain said drive ratio shifting member in a predetermined speed ratio position and said control member in locked position; and driver operated means for controlling said responsive means so as to simultaneously shift said drive ratio shifting member to a speed ratio of said multi-speed drive axle corresponding to the speed ratio of said single speed drive axle and to unlock said control member.

BEVERLY W. KEESE.
CHESTER A. BLAIR.